(12) United States Patent
Schulz-Hanke et al.

(10) Patent No.: US 10,566,778 B2
(45) Date of Patent: Feb. 18, 2020

(54) LINE FEEDTHROUGH FOR FEEDING LINES THROUGH A COMPONENT

(71) Applicant: HILTI AKTIENGESELLSCHAFT, Schaan (LI)

(72) Inventors: Wolfgang Schulz-Hanke, Untermeitingen (DE); Franz Popp, Buchloe (DE); Matthias Paetow, Kaufering (DE); Mario Paetow, Igling (DE)

(73) Assignee: Hilti Aktiengesellschaft, Schaan (LI)

( * ) Notice: Subject to any disclaimer, the term of this patent is extended or adjusted under 35 U.S.C. 154(b) by 45 days.

(21) Appl. No.: 15/762,547

(22) PCT Filed: Sep. 27, 2016

(86) PCT No.: PCT/EP2016/072902
§ 371 (c)(1),
(2) Date: Mar. 22, 2018

(87) PCT Pub. No.: WO2017/055237
PCT Pub. Date: Apr. 6, 2017

(65) Prior Publication Data
US 2019/0305539 A1 Oct. 3, 2019

(30) Foreign Application Priority Data

Sep. 29, 2015 (EP) ..................................... 15187318

(51) Int. Cl.
*F16L 5/04* (2006.01)
*H02G 3/22* (2006.01)
(Continued)

(52) U.S. Cl.
CPC ................. *H02G 3/22* (2013.01); *E04B 1/36* (2013.01); *E04B 1/946* (2013.01); *E04B 1/947* (2013.01); *F16L 5/025* (2013.01); *F16L 5/04* (2013.01)

(58) Field of Classification Search
CPC ..... F16L 5/04; F16L 5/02; F16L 5/025; A62C 2/065; E04F 17/08; E04B 2/7411; E04B 1/948; H02G 3/0412; H02G 3/22
(Continued)

(56) References Cited

U.S. PATENT DOCUMENTS 1,185,846 A * 6/1916 Simpson ................ H02G 3/185
220/3.7
2,448,769 A * 9/1948 Chamberlain ........ F16L 21/005
285/231
(Continued)

FOREIGN PATENT DOCUMENTS

DE 102006000184 A1 10/2007
DE 102008000420 A1 9/2009
(Continued)

*Primary Examiner* — Kyle J. Walraed-Sullivan
(74) *Attorney, Agent, or Firm* — Grüneberg and Myers PLLC

(57) ABSTRACT

A line penetration for routing a line through a building part. The line penetration includes a first lamellar element with a hollow-cylindrical first base part for receiving the line in a straight-through line opening, and with first circumferential lamellas, which extend outwardly transverse to an axial direction of the first base part; a second lamellar element with a hollow-cylindrical second base part for arrangement in a passage opening of the building part, and with second circumferential lamellas, which extend inwardly transverse to an axial direction of the line opening, where the first and second lamellas mesh with one another in the manner of a
(Continued)

comb, so that the side faces of the lamellas are impermeable to gas and bear slidingly on one another.

13 Claims, 1 Drawing Sheet

(51) Int. Cl.
    *E04B 1/36*     (2006.01)
    *E04B 1/94*     (2006.01)
    *F16L 5/02*     (2006.01)

(58) Field of Classification Search
    USPC .............................. 52/232, 220.8, 317, 220.1
    See application file for complete search history.

(56) References Cited

U.S. PATENT DOCUMENTS

| | | | |
|---|---|---|---|
| 3,913,928 A * | 10/1975 | Yamaguchi | E03C 1/14 277/604 |
| 4,005,884 A * | 2/1977 | Drori | F16L 19/08 285/323 |
| 4,293,138 A * | 10/1981 | Swantee | F16L 5/10 277/607 |
| 4,302,917 A * | 12/1981 | Fermvik | H02G 1/00 52/220.8 |
| 4,326,835 A * | 4/1982 | Wertz | F01D 5/22 416/193 A |
| 4,623,170 A * | 11/1986 | Cornwall | E04G 15/061 249/177 |
| 5,263,746 A * | 11/1993 | Cornwall | F16L 5/10 285/136.1 |
| 5,433,487 A * | 7/1995 | Kuhn | F16L 5/08 285/136.1 |
| 5,482,076 A * | 1/1996 | Taylor | F16L 55/134 137/318 |
| 5,540,450 A * | 7/1996 | Hayashi | H01R 13/5205 174/152 G |
| 6,343,412 B1 * | 2/2002 | Stephenson | F16L 55/128 138/98 |
| 6,359,224 B1 * | 3/2002 | Beele | F16L 5/10 16/2.1 |
| 6,494,463 B1 * | 12/2002 | Rank | E04G 23/0203 138/89 |
| 6,590,160 B1 * | 7/2003 | Dopfl | F16L 5/04 174/152 G |
| 6,632,999 B2 * | 10/2003 | Sempliner | E04F 15/02405 160/19 |
| 6,862,852 B1 * | 3/2005 | Beele | A62C 2/065 137/67 |
| 7,407,197 B2 * | 8/2008 | Gronquist | B29C 44/1295 138/156 |
| 7,918,486 B2 * | 4/2011 | Preisendorfer | F16L 41/088 285/136.1 |
| 8,001,737 B1 * | 8/2011 | Price | F16L 5/10 248/346.5 |
| 8,791,375 B2 * | 7/2014 | Fisher | B64D 37/32 174/653 |
| 9,722,404 B2 * | 8/2017 | Beele | H02G 3/22 |
| 2001/0001355 A1 * | 5/2001 | Shimizu | F16L 5/02 52/220.1 |
| 2003/0009961 A1 * | 1/2003 | Radke | E04G 15/061 52/220.1 |
| 2003/0192269 A1 * | 10/2003 | Radke | E04G 15/061 52/220.8 |
| 2004/0016190 A1 * | 1/2004 | Radke | E04G 15/061 52/232 |
| 2004/0045233 A1 * | 3/2004 | Beele | F16L 5/04 52/220.8 |
| 2005/0204802 A1 * | 9/2005 | Care | G01M 3/025 73/40 |
| 2006/0207792 A1 * | 9/2006 | Sakurai | E04F 17/08 174/267 |
| 2007/0099509 A1 * | 5/2007 | Fischer | E04G 15/061 439/607.41 |
| 2007/0283644 A1 * | 12/2007 | Fischer | E04G 15/061 52/288.1 |
| 2008/0088128 A1 * | 4/2008 | Staskal | E03C 1/122 285/230 |
| 2009/0084580 A1 * | 4/2009 | Sempliner | H02G 3/185 174/153 G |
| 2009/0315275 A1 * | 12/2009 | Beele | F16L 5/10 277/626 |
| 2011/0018210 A1 * | 1/2011 | Beele | F16L 5/10 277/606 |
| 2013/0068487 A1 * | 3/2013 | Klein | A62C 2/065 169/45 |
| 2015/0014943 A1 | 1/2015 | Vasinis | |
| 2015/0251028 A1 * | 9/2015 | Klein | H02G 3/0412 277/616 |
| 2016/0273682 A1 * | 9/2016 | Paetow | H02G 3/22 |

FOREIGN PATENT DOCUMENTS

| | | |
|---|---|---|
| DE | 202009003184 U1 | 7/2010 |
| EP | 2131085 A1 | 12/2009 |
| EP | 2228577 | 9/2010 |
| EP | 2703703 A1 | 3/2014 |
| WO | WO 2012/088565 A1 | 7/2012 |

* cited by examiner

LINE FEEDTHROUGH FOR FEEDING LINES THROUGH A COMPONENT

This application is a National Stage entry under § 371 of International Application No. PCT/EP2016/072902, filed on Sep. 27, 2016, and which claims the benefit of European Patent Application No. 15187318.9, filed on Sep. 29, 2015.

TECHNICAL FIELD

The invention relates to a line penetration for routing a line through a building part, especially through a building wall or building ceiling. In particular, the present invention relates in general to fire-protection measures for routing lines through a building part.

TECHNICAL BACKGROUND

In buildings and installations, lines routed through a building part, such as a wall or a ceiling, for example, must satisfy fire-protection requirements. For example, one essential requirement is that combustion gases or even fire must not be permitted to penetrate the building part, i.e. must not be permitted to travel from one room in a building to the next.

For this reason, it is customary, in the case of line penetrations through walls, to fill the intermediate space situated between the line and an inner wall of a passage opening with a flexible and rigid filling material, such as with mortar, PU bricks, acrylate sealing compound, mineral wool, especially in combination with spray coatings and the like.

In the fire situation, stresses may be caused by heat generation, in turn leading to strong mechanical forces between the wall and the line routed through it. Thereby a relative offset may develop between the line and the wall. In particular, considerable displacements between the line and the wall may also occur during earthquakes. Since the line is usually permanently bonded to the filling material, the filling material may detach, tear or break due to the occurring stresses. In particular, a relative displacement of the line perpendicular to the wall may lead to partial or complete detachment of the filling material from the line and/or from the passage opening or to tearing of the filling material. Due to the resulting cracks and gaps, the required impermeability to gas is impaired, and so combustion gases and fire are able to overcome the previously gas-tight passage opening. Therefore the previous approach of simply filling the intermediate space between the line and the inner wall of the passage opening with a filling material is not optimum.

Cable boxes common on the market are intended to route the line either through a combination of solid plastic and sealing material, although thereby the relative mobility of the line is considerably restricted, and so, in the event of violent shaking, damage to the cable box is almost unavoidable and impermeability to gas is no longer assured.

Furthermore, intumescent lamellas may be provided, which indeed ensure improved mobility of the routed line but do not have adequate impermeability to smoke gas.

A further approach is known, for example, from DE 10 2008 000 420 A1, in which a line penetration is disclosed that has a closed space for routing a line. An insert of intumescent material and at least one sealing element of an elastic material are provided in the housing of the line penetration, in order to achieve sealing in the fire situation.

A line penetration for routing lines through a building part is known from DE 10 2006 000 184 A1. The line penetration has a jacket tube and a base part, which is attached to a first axial end of the jacket tube and comprises a receiving space, surrounding a penetration, for a firestop material. Furthermore, an annular membrane-like sealing element is disposed at the first axial end of the jacket tube. A further membrane-like sealing element is disposed at the second axial end of the jacket tube, in order to seal the line penetration.

It is one object of the present invention to provide a line penetration with which a line can be routed through a building part, for example a wall or a ceiling, so that this is impermeable to smoke gases in a fire situation. Furthermore, it is intended to ensure tolerance to shaking and relative displacements between the line and the building part, so that the impermeability of the line penetration is not impaired even after a relative displacement.

DISCLOSURE OF THE INVENTION

This object is solved by the line penetration according to claim 1 as well as by the line-penetration arrangement according to the secondary claim.

Further configurations are specified in the dependent claims.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

The terms "exhibit", "with" and "have" are intended to be inclusive and mean that elements other than those cited may also be meant.

According to a first aspect, a line penetration is provided for routing a line through a building part, especially a wall or a ceiling of a building. The line penetration comprises:
 a first inner lamellar element with a hollow-cylindrical first base part for receiving the line in a line opening, and with first circumferential lamellas, which extend outwardly transverse to an axial direction of the first base part;
 a second outer lamellar element with a hollow-cylindrical second base part for arrangement in a passage opening of the building part, and with second circumferential lamellas, which extend inwardly transverse to an axial direction of the second base part,
wherein the first and second lamellas mesh with one another in the manner of a comb, so that the side faces of the lamellas are impermeable to gas and bear slidingly on one another.

One idea of the above line penetrations consists in the combination of a first lamellar element and a second lamellar element, wherein the first lamellar element has first lamellas that protrude annularly in outward direction from a first base part and the second lamellar element has second lamellas that protrude annularly in inward direction from a second base part. The simplest combination of a first lamellar element and a second lamellar element consists in the fact that the first lamellar element has at least one lamella that protrudes annularly in outward direction from a first base part and the second lamellar element has a lamella that protrudes annularly in inward direction from a second base part. A line, which is routed through a passage opening in the building part, may be routed through a line opening of the first base part. The lamellar elements mesh with one another in the manner of a comb and in this way may be inserted into the passage opening of the building part. In the process, the first and second lamellas of the lamellar elements overlap mutually, so that impermeability to gas is achieved along the direction of the extent of the line opening or through the passage opening.

In the inserted condition, movement of a routed-through line perpendicular to the axial direction of the line opening or in the surface direction of the cross section of the passage opening can be absorbed by displacement of the lamellas into one another. An offset of the line in axial direction of the line opening can be absorbed by the first lamellar element or by sliding of the line in the first base part of the first lamellar element. By the combination of lamellar elements, it is ensured that the line is able to move in one direction relative to the building part without causing a permeability to gas through the passage opening.

Furthermore, the first and/or the second lamellas have a preferably rectangular cross section and in particular may be disposed with surfaces parallel to one another.

It may be provided that the first base part and/or the first lamellas and/or the second lamellas are formed with intumescent material.

Furthermore, at least the first and the second lamellas may be formed from a flexible or elastic material. Thereby tensile loading of the first lamellar elements can be flexibly absorbed, so that, under certain circumstances, the lamellas can be successively disengaged from one another, wherein impermeability to gas is nevertheless ensured until the last of the lamellas becomes disengaged between two of the respective other lamellas.

According to one embodiment, the first and the second lamellas may respectively have lengths such that they do not become disengaged in any region if the first lamellas bump into the second base part or the second lamellas bump into the first base part due to displacement of the first base part transverse to the direction of axial extent of the line opening.

In particular, in the case of circular cross sections of the first and second base parts, the lengths of the first and second lamellas may respectively be greater than 50% of the spacing between the first and second base parts.

Furthermore, the first and second lamellas may respectively have lengths such that they overlap in every possible direction transverse to the axial direction of the base part, at least over a length greater than the smaller of the spacings among the minimum spacing between one end of the first lamellas and the second base part and the minimum spacing between one end of the second lamellas and the first base part.

Furthermore, the line opening may be equipped with a sliding device on its inside shell surface, so that the line is guided slidingly and gas-tightly through the line opening. Thereby relief from tension on the first lamellar element can be achieved.

In particular, the sliding device may have a coil of sliding film and/or a lubricant, which if necessary is mixed with at least one fire-protection additive and/or has been modified in a manner relevant to fire protection.

Alternatively, the line may be fixed in the line opening in such a way that the line is joined permanently to the first base part.

According to one embodiment, the first and/or the second lamellar element may be slit completely along the axial direction of the line opening.

Furthermore, the first and/or the second lamellar element may also have the shape of a half shell or may consist of several portions, which may be inserted in this way into the passage opening of the building part. This facilitates the ease of mounting of the line penetration.

According to a further aspect, a line-penetration arrangement is provided that comprises a building part with a passage opening and the above line penetration, wherein the second base part is fixed in the passage opening.

BRIEF DESCRIPTION OF THE DRAWINGS

Embodiments will be explained in more detail hereinafter on the basis of the attached drawings, wherein.

DESCRIPTION OF EMBODIMENTS

Figure 1:
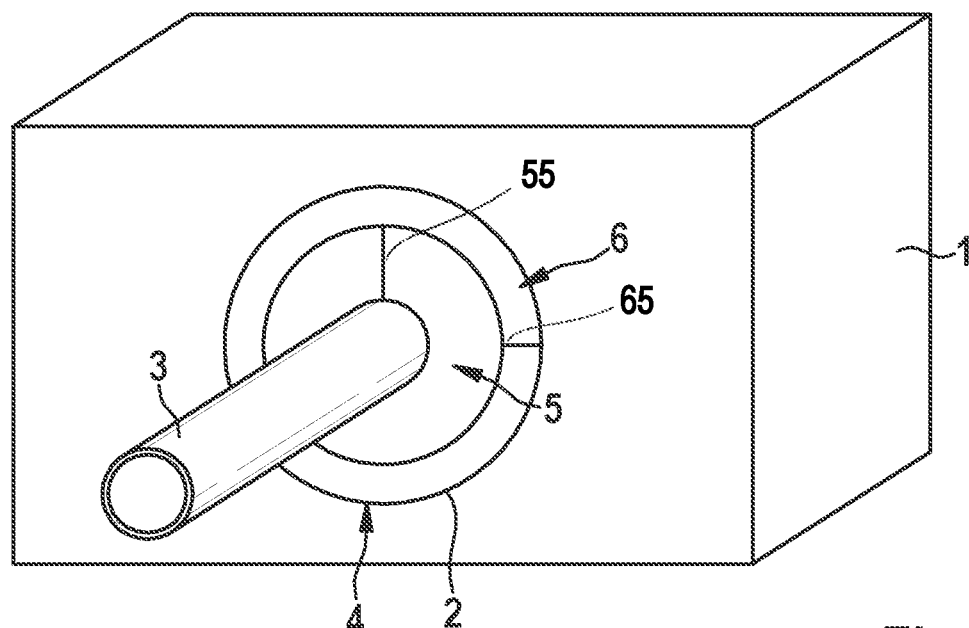
FIG. 1 shows a perspective diagram of a wall portion with a line penetration for a line.

FIG. 1 illustrates a portion of a wall 1 (or of another building part) with a passage opening 2 extending through the width of wall 1. A line 3 is routed through passage opening 2. Line 3 may be a cable, a cable duct, a pipe, a cable route, a ventilation pipe, a ventilation damper or a similar component.

A line penetration 4 is provided that is disposed between line 3 and the inside wall of passage opening 2, in order on the one hand to permit flexible movement of line 3 in all spatial directions relative to passage opening 2. At the same time, impermeability to gas should be ensured in the fire situation, even if an offset of line 3 relative to passage opening 2 has occurred, for example due to a prior earthquake or other shaking.

Figure 2:
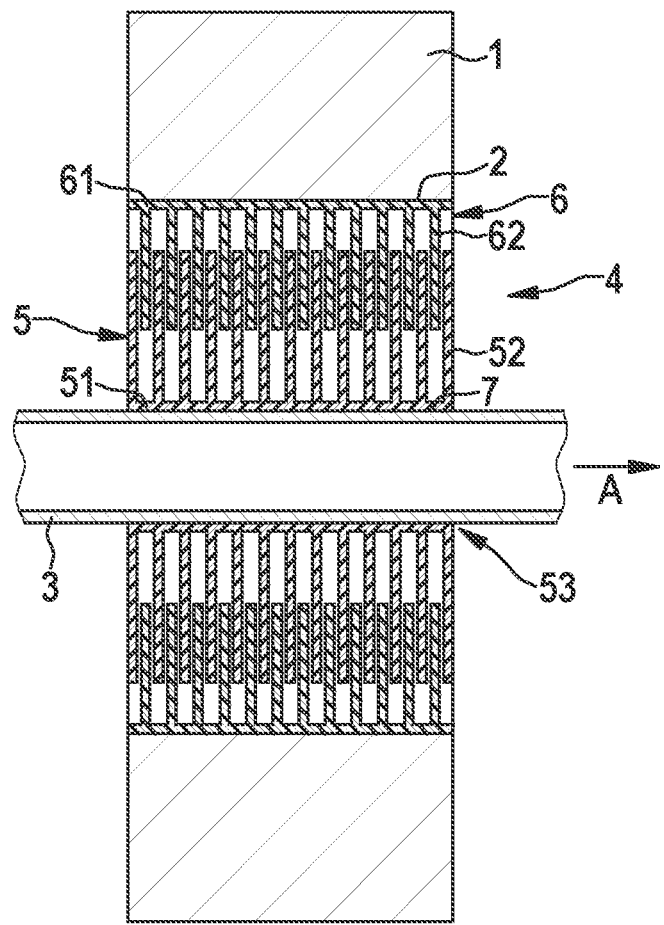
FIG. 2 shows a cross-sectional diagram through the passage opening through the wall with the line penetration inserted.

As is apparent in conjunction with the cross-sectional diagram in FIG. 2, line penetration 4 has a first inner lamellar element 5 and a second outer lamellar element 6.

First lamellar element 5 has a first, substantially hollow cylindrical base part 51, which comprises a straight-through line opening 53 for receiving line 3. In other words, first lamellar element 5 is disposed around the portion of line 3 situated in passage opening 2. First base part 51 may be joined permanently to the line, e.g. by adhesive bonding, so that any movement of line 3 is also executed by first base part 51 of first lamellar element 5.

Alternatively, first base part 51 may guide line 3 slidingly and for this purpose, for example, also have a sheath 7, which is able to move slidingly along the shell surface of line 3.

Furthermore, a sliding device, which is formed in some other way, may be provided between the shell surface of line 3 and the inside surface of first base part 51. The sliding device is in the form of a coating of a material having sliding ability, such as a pasty slippery substance, e.g. lubricant or gel, or a solid slippery material, such as non-stick tape or PTFE.

One or more circumferential first lamellas 52 protrude radially outward from first base part 51. Thereby first lamellas 52 are substantially disposed with surfaces parallel to one another. First lamellas 52 have preferably a rectangular cross section.

Second lamellar element 6 has a second base part 61. Second base part 61 is likewise of hollow-cylindrical shape and has a cross-sectional contour that corresponds in such a way to the cross-sectional contour of passage opening 2 in which line penetration 4 is inserted that second base part 61 can be securely disposed in passage opening 2 and that no gas permeability exists between the inside wall of passage opening 2 and the outer shell surface of second base part 61. Besides the illustrated round cross-sectional contour of passage opening 2, other cross-sectional contours may also be provided, such as rectangular, oval or polygonal cross-sectional contours.

From second base part 61, second lamellas 62 protrude inwardly, perpendicular to the axial direction of passage opening 2. Second lamellas 62 extend circumferentially around first lamellar element 5. Thereby second lamellas 62 are substantially disposed with surfaces parallel to one another. Second lamellas 62 likewise have preferably a rectangular cross section.

Lamellar elements 5, 6, or at least lamellas 52, 62 may be formed from a flexible or elastic material, such as a foam material, a plastic material, for example polyacryl, silicone, polyurethane or the like.

First base part 51 and/or first lamellas 52 and/or second lamellas 62 may further contain an intumescent material, which expands in such a way when exposed to heat that, in the fire situation, complete closure of passage opening 2 is achieved and, for example, a pipe that may be present is squeezed if necessary.

The lamellas of the first and second lamellar elements 5, 6 are able to mesh with one another in the manner of a comb, so that first and second lamellas 52, 62 mutually overlap in a direction transverse to axial direction A, i.e. the direction of extent of line opening 53.

The width of first lamellas 52 in axial direction A may correspond substantially or be adapted to the width of the spacing of second lamellas 62, as may the width of second lamellas 52 in axial direction to the width of the spacing of first lamellas 52. Thereby the spacings of lamellas 52, 62 and their widths are matched to one another in order to ensure mobility and at the same time impermeability to gas. Thus first and second lamellar elements 5, 6 may be associated with one another in such a way that first lamellas 52 of first lamellar element 5 project into the intermediate spaces between second lamellas 62 of second lamellar element 6. In the process, portions of the side faces of lamellas 52, 62 bear slidingly on one another, so that movement of lamellas 52, 62 relative to one another is permitted, especially in the direction transverse to the direction of axial extent of line 3.

If line 3 now moves in the direction of a surface direction of the cross-sectional area of passage opening 2 or transverse to the direction of axial extent of line 3, this leads to displacement of the side faces of lamellas 52, 62 toward one another. By the fact that the side faces of lamellas 52, 62 do not become disengaged from one another over the entire circumference in this process but bear against one another even after the displacement, impermeability to gas of passage opening 2 is not impaired by displacement transverse to the direction of axial extent A of line 3.

The lengths of first and second lamellas 52, 62 in the direction transverse to the direction of extent of line 3 are much smaller than the spacing between line 3 or first base part 51 bearing thereon and the inside surface of passage opening 2 or second base part 61 bearing thereon. The lengths of first and second lamellas 52, 62 in a direction transverse to the direction of extent of line 3 are preferably chosen such that, during insertion of line penetration 4, they overlap mutually with a predetermined length in every possible direction transverse to the direction of extent of line 3. Thereby movement transverse to line 3 is possible without resulting in a gas leak.

Preferably, it is provided that first or second lamellas 52, 62 bump into first base part 51 or second base part 62 respectively and prevent further relative movement of line 3 before oppositely disposed portions of first and second lamellas 52, 62 become disengaged from one another and a gas leak develops. As an example, this is achieved for a round cross section of passage opening 2 when the length of first lamellas 52 and of second lamellas 62 is greater than 50% of the spacing between first base part 51 and second base part 61.

In the case that first base part 51 is permanently joined to line 3, relative movement of the line in the direction of axial extent of line 3 or perpendicular to the surface direction of the cross-sectional area of passage opening 2 can be absorbed for the time being by bending of lamellas 52, 62 without impairing the impermeability to gas. If further displacement of line 3 in the direction of its longitudinal extent takes place, lamellas 52, 62 may become disengaged from one another, although the impermeability to gas is preserved as long as at least one first or second lamella 52, 62 remains held between two of the second or first lamellas 62, 52 respectively.

For mounting, each of the first and the second lamellar element may comprise a slit (55, 65) completely along the axial direction of the line opening, as shown in FIG. 1.

The invention claimed is:

1. A line penetration for routing a line through a building part, comprising:
a first lamellar element with a hollow-cylindrical first base part for receiving the line in a straight-through line opening, and with first circumferential lamellas, which extend outwardly transverse to an axial direction of the first hollow-cylindrical base part;
a second lamellar element with a hollow-cylindrical second base part for arrangement in a passage opening of the building part, and with second circumferential lamellas, which extend inwardly transverse to an axial direction of the straight-through line opening, wherein the first and second circumferential lamellas mesh with one another, so that side faces of the first and second circumferential lamellas are impermeable to gas and bear slidingly on one another, and wherein ends of the first circumferential lamellas are spaced from the second hollow-cylindrical base part of the second lamellar element and ends of the second circumferential lamellas are spaced from the first hollow-cylindrical base part of the first lamellar element to allow the first and second circumferential lamellas to move relative to one another.

2. The line penetration according to claim 1, wherein the first and/or the second circumferential lamellas have a rectangular cross section.

3. The line penetration according to claim 1, wherein the first hollow-cylindrical base part and/or the first circumferential lamellas and/or the second circumferential lamellas comprises an intumescent material.

4. The line penetration according to claim 1, wherein at least the first and the circumferential second lamellas comprise a flexible or elastic material.

5. The line penetration according to claim 1, wherein the first and the second circumferential lamellas respectively have lengths to prevent the first and second circumferential lamellas from becoming disengaged in any region if the first circumferential lamellas bump into the second hollow-cylindrical base part or the second circumferential lamellas bump into the first hollow-cylindrical base part due to displacement of the first base part transverse to the direction of axial extent.

6. The line penetration according to claim 5, wherein, each of the first and second hollow-cylindrical base parts has a circular cross section and wherein the lengths of the first and second circumferential lamellas are respectively greater than 50% of the spacing between the first and second hollow-cylindrical base parts.

7. The line penetration according to claim 1, wherein the first and second circumferential lamellas respectively have lengths such that the first and second circumferential lamellas overlap in every possible direction transverse to the axial direction of the straight-through line opening, at least over a length greater than a smaller of spacings among a minimum spacing between one end of the first circumferential lamellas and the second hollow-cylindrical base part and a minimum spacing between one end of the second circumferential lamellas and the first hollow-cylindrical base part.

8. The line penetration according to claim 1, further comprising a sliding device located on an inner shell surface of the line straight-through opening, wherein the sliding device is to allows the line to slide in a gas-tight manner through the straight-through line opening.

9. The line penetration according to claim 8, wherein the sliding device has a coil of sliding film and/or a lubricant.

10. The line penetration according to claim 1, wherein a line is present, wherein the line is fixed in the straight-through line opening.

11. The line penetration according to claim 1, wherein the first and the second lamellar elements are slit completely along the axial direction of the straight-through line opening.

12. A line-penetration arrangement, comprising:
a building part with a passage opening;
a line penetration according to claim 1,
wherein the second hollow-cylindrical base part is fixed in the passage opening.

13. The line penetration according to claim 1, wherein the first and/or the second circumferential lamellas have a rectangular cross section and are disposed with surfaces parallel to one another.

* * * * *